(12) United States Patent
Sirohey et al.

(10) Patent No.: US 7,702,141 B2
(45) Date of Patent: Apr. 20, 2010

(54) METHOD FOR QUANTIFYING AN OBJECT IN A LARGER STRUCTURE USING A RECONSTRUCTED IMAGE

(75) Inventors: Saad Ahmed Sirohey, Pewaukee, WI (US); David Charles Mack, Waukesha, WI (US); Peter Lehel, Oconomowoc, WI (US); Toan Thanh Le, Germantown, WI (US); Kelly Ann Mohr, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 1055 days.

(21) Appl. No.: 11/169,830

(22) Filed: Jun. 29, 2005

(65) Prior Publication Data

US 2007/0003122 A1    Jan. 4, 2007

(51) Int. Cl.
    *G06K 9/00*    (2006.01)
(52) U.S. Cl. ..................................... 382/131
(58) Field of Classification Search .......... 382/128–132
    See application file for complete search history.

(56) References Cited

U.S. PATENT DOCUMENTS

| | | | |
|---|---|---|---|
| 6,331,116 B1 * | 12/2001 | Kaufman et al. | 434/262 |
| 6,366,797 B1 * | 4/2002 | Fisher et al. | 600/410 |
| 6,476,803 B1 * | 11/2002 | Zhang et al. | 345/419 |
| 6,577,752 B2 | 6/2003 | Armato, III et al. | |
| 6,597,762 B1 | 7/2003 | Ferrant et al. | |
| 6,811,310 B2 | 11/2004 | Lang et al. | |
| 6,813,375 B2 | 11/2004 | Armato, III et al. | |
| 6,891,922 B2 * | 5/2005 | Ferrant et al. | 378/62 |
| 6,912,319 B1 | 6/2005 | Barnes et al. | |
| 7,260,250 B2 * | 8/2007 | Summers et al. | 382/128 |
| 7,391,895 B2 * | 6/2008 | Wang et al. | 382/132 |
| 2002/0044696 A1 | 4/2002 | Sirohey et al. | |
| 2002/0057844 A1 | 5/2002 | Sirohey et al. | |
| 2002/0057850 A1 | 5/2002 | Sirohey et al. | |

(Continued)

FOREIGN PATENT DOCUMENTS

GB    2 383 917 A    7/2003

OTHER PUBLICATIONS

Schoepf, et. al., CT of Cornary Artery Disease, Radiology, 2004, pp. 18-37, vol. 232, No. 1, RSNA.

(Continued)

*Primary Examiner*—Bhavesh M Mehta
*Assistant Examiner*—Hadi Akhavannik
(74) *Attorney, Agent, or Firm*—Armstrong Teasdale LLP

(57) ABSTRACT

A computer-implemented method for quantifying an object in a larger structure using a reconstructed image obtained from an imaging apparatus includes identifying an object boundary in a region of interest of the image and a region of exclusion, and determining a mean value of intensity in a neighborhood of the object to estimate a background value, excluding the region of exclusion. The method further includes determining an interior region, a transition region, and a background region of the object using the object boundary and a transfer function of the imaging apparatus, and determining and displaying a measure of object quantification utilizing intensities of at least one of the determined interior region or the transition region a method for quantifying an object in a larger structure using a reconstructed image obtained from an imaging apparatus.

24 Claims, 7 Drawing Sheets

U.S. PATENT DOCUMENTS

| | | |
|---|---|---|
| 2004/0105527 A1 | 6/2004 | Ferrant et al. |
| 2004/0252870 A1* | 12/2004 | Reeves et al. ............... 382/128 |
| 2004/0258286 A1 | 12/2004 | Salla et al. |
| 2004/0264753 A1 | 12/2004 | Capolunghi et al. |
| 2005/0094858 A1 | 5/2005 | Sirohey et al. |
| 2005/0113665 A1 | 5/2005 | Mohr et al. |
| 2005/0113960 A1 | 5/2005 | Karau et al. |
| 2005/0135554 A1 | 6/2005 | Mohr et al. |
| 2005/0152587 A1 | 7/2005 | Sirohey et al. |
| 2005/0232485 A1* | 10/2005 | Brown et al. ................ 382/173 |

OTHER PUBLICATIONS

Lucas, et al., Accuracy and Precision Improvement in Pulmonary Nodule Volume Measurements Incorporating the MTF and PArtial Volume Information, 2002, Q02-1304, RSNA.

* cited by examiner

METHOD FOR QUANTIFYING AN OBJECT IN A LARGER STRUCTURE USING A RECONSTRUCTED IMAGE

BACKGROUND OF THE INVENTION

This invention relates generally to imaging, and more particularly to determining the mass and the volume of an object or objects in reconstructed images. Configurations of the present invention are particularly useful in medical and diagnostic computed tomographic (CT) applications for quantification of calcification and/or lesions, but the present invention is not limited to medical applications or to CT.

In some known CT imaging system configurations, an x-ray source projects a fan-shaped beam which is collimated to lie within an X-Y plane of a Cartesian coordinate system and generally referred to as an "imaging plane". The x-ray beam passes through an object being imaged, such as a patient. The beam, after being attenuated by the object, impinges upon an array of radiation detectors. The intensity of the attenuated radiation beam received at the detector array is dependent upon the attenuation of an x-ray beam by the object. Each detector element of the array produces a separate electrical signal that is a measurement of the beam intensity at the detector location. The intensity measurements from all the detectors are acquired separately to produce a transmission profile.

In third generation CT systems, the x-ray source and the detector array are rotated with a gantry within the imaging plane and around the object to be imaged such that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector.

In an axial scan, the projection data is processed to construct an image that corresponds to a two-dimensional slice taken through the object. One method for reconstructing an image from a set of projection data is referred to in the art as the filtered backprojection technique. This process converts the attenuation measurements from a scan into integers called "CT numbers" or "Hounsfield units" (HU), which are used to control the brightness of a corresponding pixel on a cathode ray tube display.

To reduce the total scan time, a "helical" scan may be performed. To perform a "helical" scan, the patient is moved while the data for the prescribed number of slices is acquired. Such a system generates a single helix from a fan beam helical scan. The helix mapped out by the fan beam yields projection data from which images in each prescribed slice may be reconstructed.

Reconstruction algorithms for helical scanning typically use helical weighing algorithms that weight the collected data as a function of view angle and detector channel index. Specifically, prior to a filtered backprojection process, the data is weighted according to a helical weighing factor, which is a function of both the gantry angle and detector angle. The weighted data is then processed to generate CT numbers and to construct an image that corresponds to a two-dimensional slice taken through the object.

To further reduce the total acquisition time, multi-slice CT has been introduced. In multi-slice CT, multiple rows of projection data are acquired simultaneously at any time instant. When combined with helical scan mode, the system generates a single helix of cone beam projection data. Similar to the single slice helical, weighting scheme, a method can be derived to multiply the weight with the projection data prior to the filtered backprojection algorithm.

Coronary artery disease (CAD) is a leading cause of death in the developed world. One known diagnostic imaging exam for the diagnosis of CAD is coronary angiography, which can be used to detect blockages or obstructions in coronary arteries resulting from buildup of plaque. Coronary angiography is an invasive exam, and its application to a large asymptomatic population for the purpose of earlier detection of the disease is impractical. However, coronary artery calcification (CAC) is a good indicator of the presence of plaque. CAC can be imaged using non-invasive methods like computed tomography (CT) imaging.

Imaging the heart poses special difficulties due to its constant motion. An imaging modality used to isolate the motion of a heart requires an acquisition speed of less than 50 ms per slice. Angiography is ideally suited for imaging blockages in the coronary arteries because it provides an acquisition speed of less than 10 ms. Known CT image acquisition systems that provide prospective and retrospective cardiac gating cardiac gating using electrocardiogram (ECG) signals have acquisition speeds that approach about 100 ms. This speed is sufficient to freeze the left portion of a heart at end diastole for imaging the left coronary arteries, which are the arteries of most concern in CAD detection. Known CT imaging systems using cardiac gating make it possible to image a heart non-invasively to determine calcification content of coronary arteries.

A known clinical cause for coronary calcification is a "healing" process of a vessel after its weakening due to a buildup of plaque. There are three stages of calcification of a vessel, namely, a) a completely healed vessel, b) a partially healed vessel, or c) a vessel that has just started the healing process. A vessel may also be between two of these stages. At least some known algorithms for calcification determination utilize AJ, mass score and/or volume score to determine calcification content of arteries. However, variability in reproducibility of the calcification mass and volume results of the known algorithms has been cited as a reason for using CAC only as a very specific negative test.

BRIEF DESCRIPTION OF THE INVENTION

In one aspect, the present invention provides a computer-implemented method for quantifying an object in a larger structure using a reconstructed image obtained from an imaging apparatus. The method includes identifying an object boundary in a region of interest of the image and a region of exclusion, and determining a mean value of intensity in a neighborhood of the object to estimate a background value, excluding the region of exclusion. The method further includes determining an interior region, a transition region, and a background region of the object using the object boundary and a transfer function of the imaging apparatus, and determining and displaying a measure of object quantification utilizing intensities of at least one of the determined interior region or the transition region a method for quantifying an object in a larger structure using a reconstructed image obtained from an imaging apparatus.

In another aspect, the present invention provides an imaging system that includes a radiation source, a radiation detector configured to detect radiation emitted by the radiation source passing through an object in a larger structure, and to provide signals indicative of the object, and a processor and a display configured to utilize the signals provided by the radiation detector to display an image of the object, wherein the image includes a plurality of voxels. The imaging system also includes an input device configured to accept an identification of an object boundary in a region of interest of the image and a region of exclusion. The imaging system is configured to identify the object boundary in the region of interest of the image and the region of exclusion, determine a mean value of intensity in a neighborhood of the object to estimate a background value, excluding the region of exclusion, and determine an interior region, a transition region, and a background region of the object using the object boundary and a transfer function of the imaging apparatus. The imaging system is further configured to determine and display a measure of object quantification utilizing intensities of at least one of the determined interior region or the transition region.

In yet another aspect, the present invention provides a machine readable medium having instructions recorded thereon that are configured to instruct a processor to identify, in an image an object in a larger structure, an object boundary in a region of interest and identify a region of exclusion and to determine a mean value of intensity in a neighborhood of the object to estimate a background value, excluding the region of exclusion. The instructions are further configured to determine an interior region, a transition region, and a background region of the object using the object boundary and a transfer function of the imaging apparatus, and to determine and display a measure of object quantification utilizing intensities of at least one of the determined interior region or the transition region.

It will be appreciated that accurate and robust estimated measurements for mass and volume of coronary calcification can be obtained using configurations of the present invention, thus allowing increased confidence in CT imaging as a diagnostic method for calcification.

DETAILED DESCRIPTION OF THE INVENTION

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also as used herein, the phrase "reconstructing an image" is not intended to exclude embodiments of the present invention in which data representing an image is generated but a viewable image is not. However, many embodiments generate (or are configured to generate) at least one viewable image.

The recitation of a single object or action is not intended to exclude configurations involving plural said objects or said actions from the scope of a claim, unless it is explicitly recited otherwise. For example, a claim reciting the action "identifying a region of exclusion" without further qualification as to number is intended to include within its scope configurations in which a plurality of regions of exclusion are identified.

Technical effects of the present invention include, but are not limited to, the use of a reconstructed image to determine and display either the mass or the volume of an object depicted therein within another object, taking into account imperfections and characteristics of the imaging device. As used herein, unless referring to an image actually being displayed, the scope of the subject matter referred to by the term "image" is also intended to include data representing an image, i.e., an image in a form useful for processing by a computer.

Figure 1:
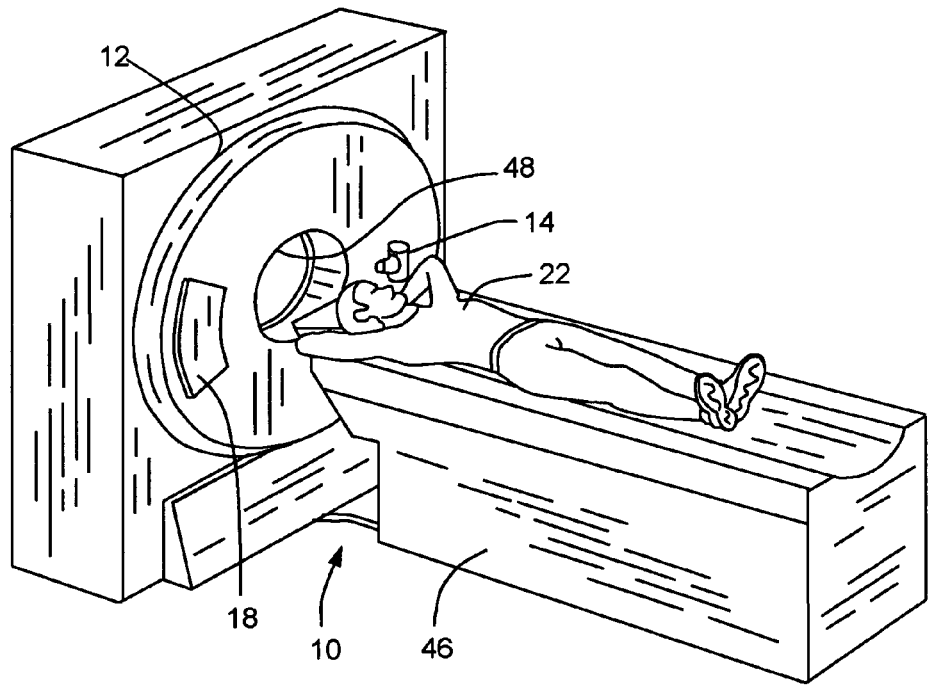
FIG. 1 is a pictorial drawing of a configuration of a computed tomographic (CT) imaging system of the present invention.
Figure 2:
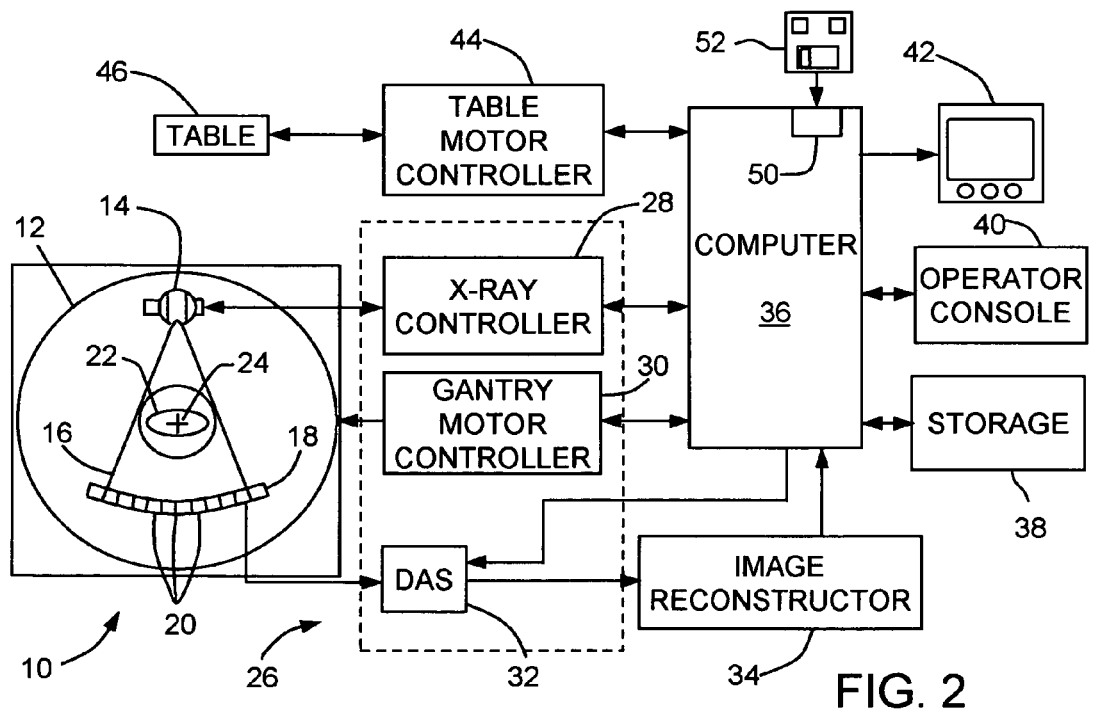
FIG. 2 is a schematic block diagram of the CT imaging system of FIG. 1.

In some configurations and referring to FIGS. 1 and 2, a multi-slice scanning imaging system, for example, a Computed Tomography (CT) imaging system 10, is shown as including a gantry 12 representative of a "third generation" CT imaging system. Gantry 12 has an x-ray tube 14 (also called x-ray source 14 herein) that projects a beam of x-rays 16 toward a detector array 18 on the opposite side of gantry 12. Detector array 18 is formed by a plurality of detector rows (not shown) including a plurality of detector elements 20 which together sense the projected x-rays that pass through an object, such as a medical patient 22 between array 18 and source 14. Each detector element 20 produces an electrical signal that represents the intensity of an impinging x-ray beam and hence can be used to estimate the attenuation of the beam as it passes through object or patient 22. During a scan to acquire x-ray projection data, gantry 12 and the components mounted therein rotate about a center of rotation 24. FIG. 2 shows only a single row of detector elements 20 (i.e., a detector row). However, multi-slice detector array 18 includes a plurality of parallel detector rows of detector elements 20 such that projection data corresponding to a plurality of quasi-parallel or parallel slices can be acquired simultaneously during a scan.

Rotation of components on gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of components on gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high-speed image reconstruction. The reconstructed image is applied as an input to a computer 36, which stores the image in a storage device 38. Image reconstructor 34 can be specialized hardware or computer programs executing on computer 36.

Computer 36 also receives commands and scanning parameters from an operator via console 40 that has a keyboard and/or other user input and/or marking devices, such as a mouse, trackball, or light pen. An associated display 42, examples of which include a cathode ray tube (CRT) display, liquid crystal display (LCD), or plasma display, allows the operator to observe the reconstructed image and other data from computer 36. Display 42 may include a user pointing device, such as a pressure-sensitive input screen. The operator supplied commands and parameters are used by computer 36 to provide control signals and information to DAS 32, x-ray controller 28, and gantry motor controller 30. In addition, computer 36 operates a table motor controller 44, which controls a motorized table 46 to position patient 22 in gantry 12. Particularly, table 46 moves portions of patient 22 through gantry opening 48.

In one embodiment, computer 36 includes a device 50, for example, a floppy disk drive, CD-ROM drive, DVD drive, magnetic optical disk (MOD) device, or any other digital device including a network connecting device such as an Ethernet device for reading instructions and/or data from a computer-readable medium 52, such as a floppy disk, a CD-ROM, a DVD or another digital source such as a network or the Internet, as well as yet to be developed digital means. In another embodiment, computer 36 executes instructions stored in firmware (not shown). Computer 36 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. Although the specific embodiment mentioned above refers to a third generation CT system, the methods described herein equally apply to fourth generation CT systems (stationary detector—rotating x-ray source) and fifth generation CT systems (stationary detector and x-ray source). Additionally, it is contemplated that the benefits of the invention accrue to imaging modalities other than CT. Additionally, although the herein described methods and apparatus are described in a medical setting, it is contemplated that the benefits of the invention accrue to non-medical imaging systems such as those systems typically employed in an industrial setting or a transportation setting, such as, for example, but not limited to, a baggage scanning system for an airport or other transportation center.

Figure 3:
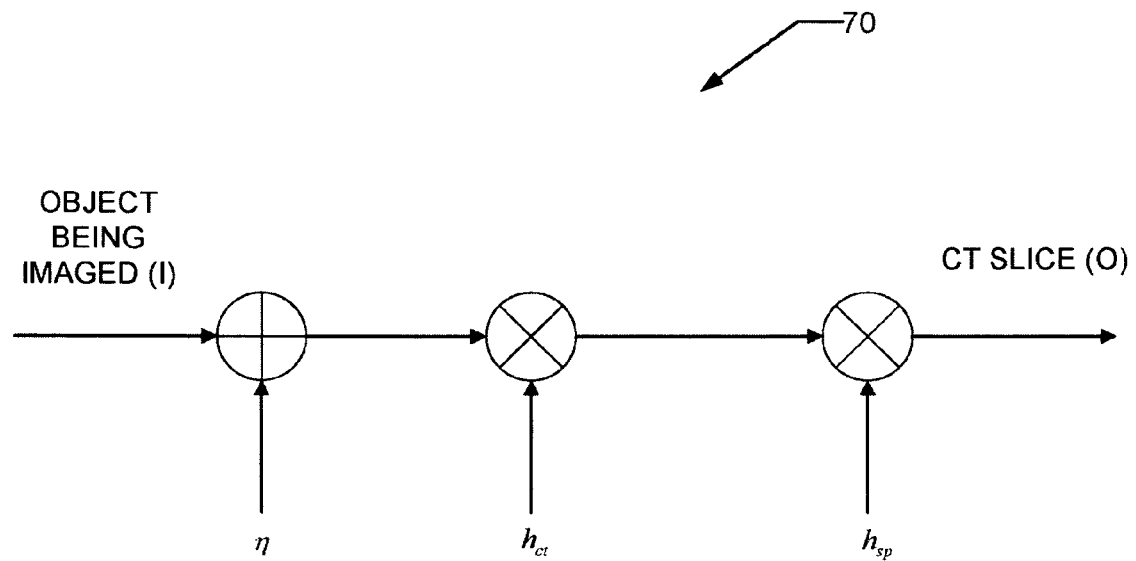
FIG. 3 is a representation of a system transfer function of the CT imaging system of FIGS. 1 and 2.

Density D, volume V, and mass m of an object are related by the relationship m=DV. CT imaging produces a value in Hounsfield units for a voxel representative of an average density of a unit volume defined by the size of the unit voxel, $\delta x \delta y \delta z$. The density of the voxel is determined by filtered backprojections of multiple rays that indicate an amount of absorbed photons in the unit volume. (For simplicity, the effect of multiple wavelengths and other approximations in reconstruction algorithms are not considered, but reconstruction filters, field of view i.e., FOV, and slice thickness are considered.) Thus, the voxel value is an average density of the volume of the voxel, and the average density is in turn related to the amount and composition of matter in that volume. If the unit voxel volume $\delta x \delta y \delta z$ is occupied by a metal, then the matter in this volume may be dense and absorb most of the radiation passing through it, resulting in a high number of Hounsfield Units (HUs). If the unit volume contains a mixture of two components, for example, calcium and water, the volume will absorb photons in proportion to the amounts of the components in the mixture. The HU of a voxel is thus an estimate of the average density of matter in the voxel volume, provided that there is no signal corruption or noise. However, CT imaging systems are not perfect and do introduce some noise, as shown in model 70 shown in FIG. 3, where $\rho$ represents additive photonic noise, $h_{ct}$ represents a CT reconstruction transfer function, $h_{sp}$ represents an effective transfer function for partial volume, and $\otimes$ represents convolution.

In prior art configurations, an algorithm to determine mass and volume of calcification relies upon the relationship $$m = CV_\tau(\mu_c - \mu_w)$$

where m is the mass, C is the calcium calibration correction, $\mu_c$ is the mean density of the thresholded volume $V_\tau$, where $\tau$ is a calibrated, user-defined threshold (for example, if a user selects 130 as the threshold, then $\tau=C\times130$), $\mu_w$ is a mean density value for water, and volume $V_\tau$ is determined by multiplying the number of voxels greater than $\tau$ by the dimension of the voxel, $\delta x \delta y \delta z$.

In some configurations of the present invention, a method is provided that determines mass and volume in two regions, namely, an interior region and a transition region.

The mass $m_I$ of the interior region is written:

$$m_I = CV_I(\mu_I - \mu_w),$$

where I indicates the interior region. In this configuration, the mean value for water, $\mu_w$, is used, because the other matter for the pin is water.

The mass $m_T$ of transition is written:

$$m_T = CV_T(\mu_T - \mu_E)$$

where T indicates the transition region. The transition volume $V_T$ is related to the total number of transition voxels multiplied by the volume of these voxels. Compensation is performed for the transition region and the exterior region E. In some configurations, a weighted contribution of the transition region is used to gain both an accurate volume and mass determination. An underlying assumption that is used is that both the interior region and the immediate exterior region are of substantially uniform values with zero mean noise. Another assumption is that the mass of the object is preserved, i.e., the system gain is unity.

Figure 4:
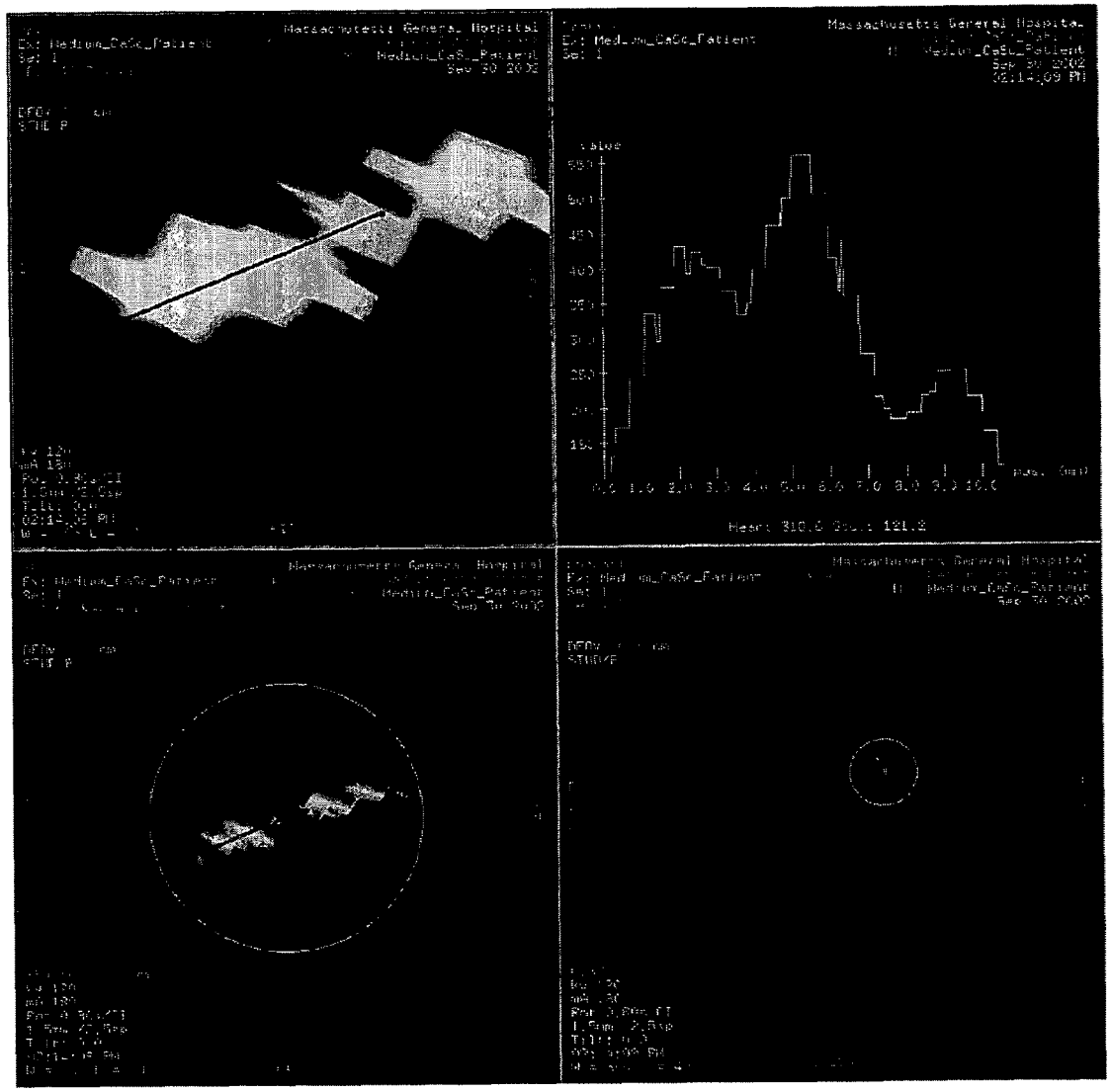
FIG. 4 is a CT image showing an actual coronary calcification.

In real cardiac CT images, such as that shown in FIG. 4, coronary calcium can come in all sizes, all densities and all combinations. The method described above is further extended in some configurations to obtain measurements of both mass and volume by using the principle of mass preservation.

For example, in some configurations, actual calcification of more than one density can be measured. If the coronary calcification is of a single density and large enough to be imaged (for example, greater than twice the linear dimension of a voxel in each direction), then the estimate of the local background is used as the reference value estimated for water. In this case, it is assumed that the calcification is mixed with plaque, vessel wall and blood, etc.

On the other hand, in some configurations, if the calcification includes a plurality of deposits at different densities, then a modification is made in which individual components are segmented and a volume of the total is generated. The selection of a segmentation method to incorporate into configurations of the present invention can be left as a design choice to one of ordinary skill in the art. Such methods include, for example, K-means clustering, watershed segmentation, level set segmentation, and others.

Thus, in some configurations of the present invention, a user interface is provided to allow a radiologist or other user to select areas in slices of an image of an object that he or she considers as being outside the region to be measured. These regions may, for example, include image artifacts resulting from beam hardening or from metallic stents adjacent to a region of interest and which should be excluded from calcification volume and/or mass measurements.

For example, in various configurations, indications of areas to be measured as well as surrounding areas that are not to be measured are provided as input by a user. Object boundaries are then identified as are unmeasurable regions. A mean value of an immediate neighborhood (excluding any unmeasurable regions) is determined to estimate a background value. Three regions for the object under consideration are determined using the object boundary and a transfer function of the imaging apparatus. Namely, in various configurations, these regions are an interior region, a transition region, and a background region. A computer program utilizing a hybrid algorithm then measures by estimation at least one of the mass or the volume of the object. Using the boundaries also permits a measurement of texture and/or shape in some configurations. The determined mass, volume, texture, and/or shape can be displayed for evaluation. The knowledge of the mass and volume of the object can, for example, allow a determination of contents of the object defined by the boundaries, such as calcification of a lumen in an organ (for example, the heart) of a person's body. Calcifications are processed to extract a volume of interest. This processing is performed for at least one, or, in many configurations, each coronary artery on each slice. The processing includes creating a connected component list of calcification marks and storing a list of all erosion marks. Next, volume membership in each slice is updated for each connected component list. In some configurations, the updating includes finding adjacent CC lists in neighboring slices.

More specifically, some configurations of the present invention provide a method for quantifying an object in a larger structure (i.e., larger than the object being quantified) using a reconstructed image obtained from an imaging apparatus, such as imaging apparatus 10 (shown in FIG. 1). In a medical environment, for example, imaging apparatus 10 can be a computed tomographic (CT) imaging system 10 that produces a computed tomographic (CT) image, the larger structure can be a heart of patient 22, and the object can be a lesion or vessel calcification. Other types of images can also be used, such as magnetic resonance images and ultrasonic images. However, configurations of the present invention are not limited to these particular objects, structures, and imaging modes, nor are configurations of the present invention limited solely to medical environments and uses.

Figure 5:
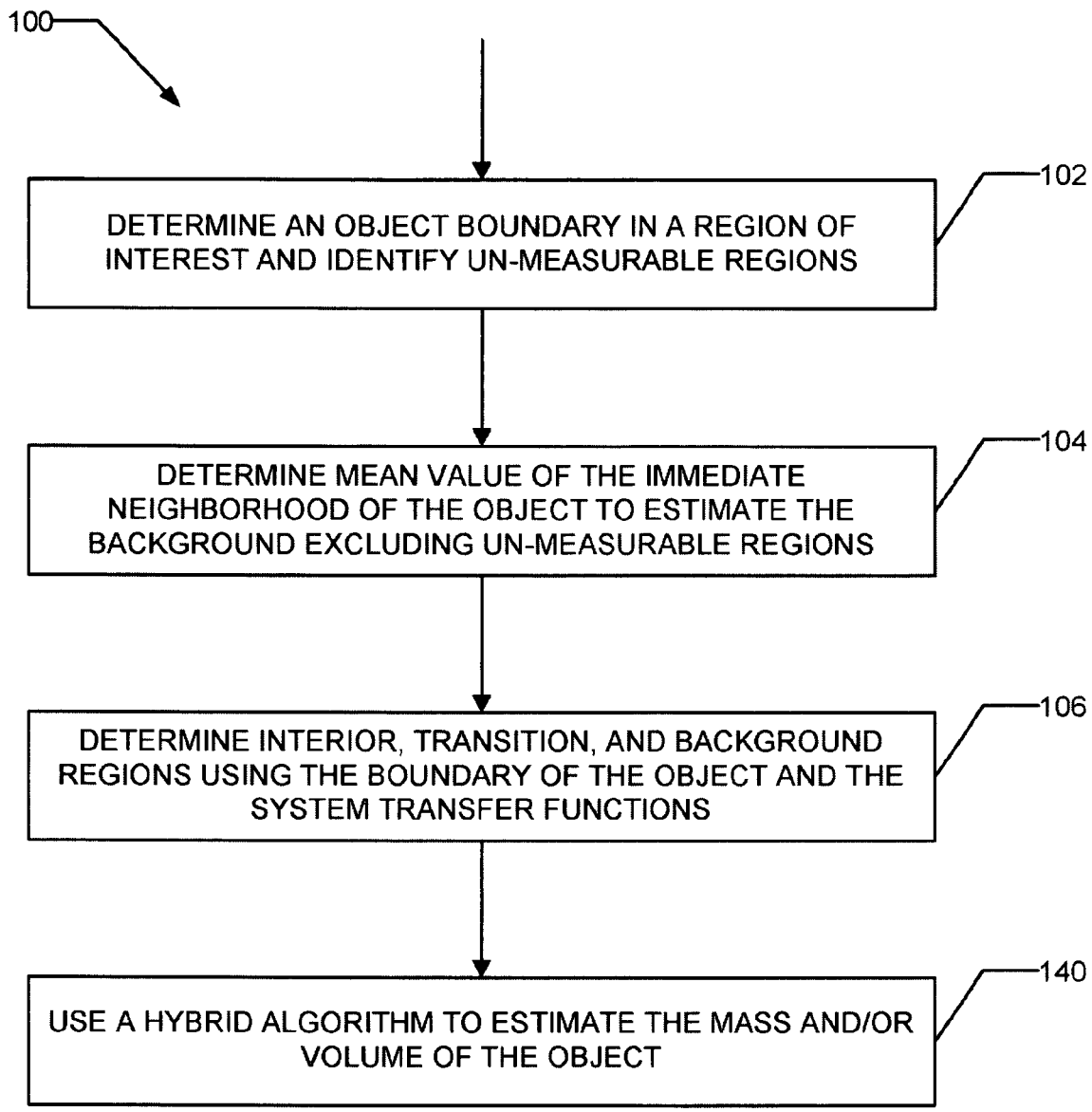
FIG. 5 is a flow chart representative of some configurations of the present invention.

A user interface is provided that allows a user (e.g., a radiologist) to initially mark calcification and make corrections. The initial marking and corrections comprises the marking of calcification in slices where calcification exists and the deletion or erasure of marks that the user believes are not valid. In some configurations and referring to flow chart 100 of FIG. 5, a technical effect of the present present invention is achieved by software or firmware running on computer 36 (or a stand-alone computer or workstation, not shown, that reads or has image data available from another source or in its own memory) first using these markings to determine 102 an object boundary in a region of interest of the image and also a region of exclusion, i.e., unmeasurable regions. Next, a mean value of intensity of the object is determined 104 in an immediate vicinity of the object to estimate a background that excludes regions determined to be unmeasurable. An interior region, a transition region, and a background region of the object is then determined 106 using intensities of at least one of the determined interior regions and the transition region. Next, a hybrid algorithm is used 140 to estimate and display 140 at least one of the volume or the mass of the object, utilizing intensities of at least one of the determined interior region or the transition region.

Figure 6:
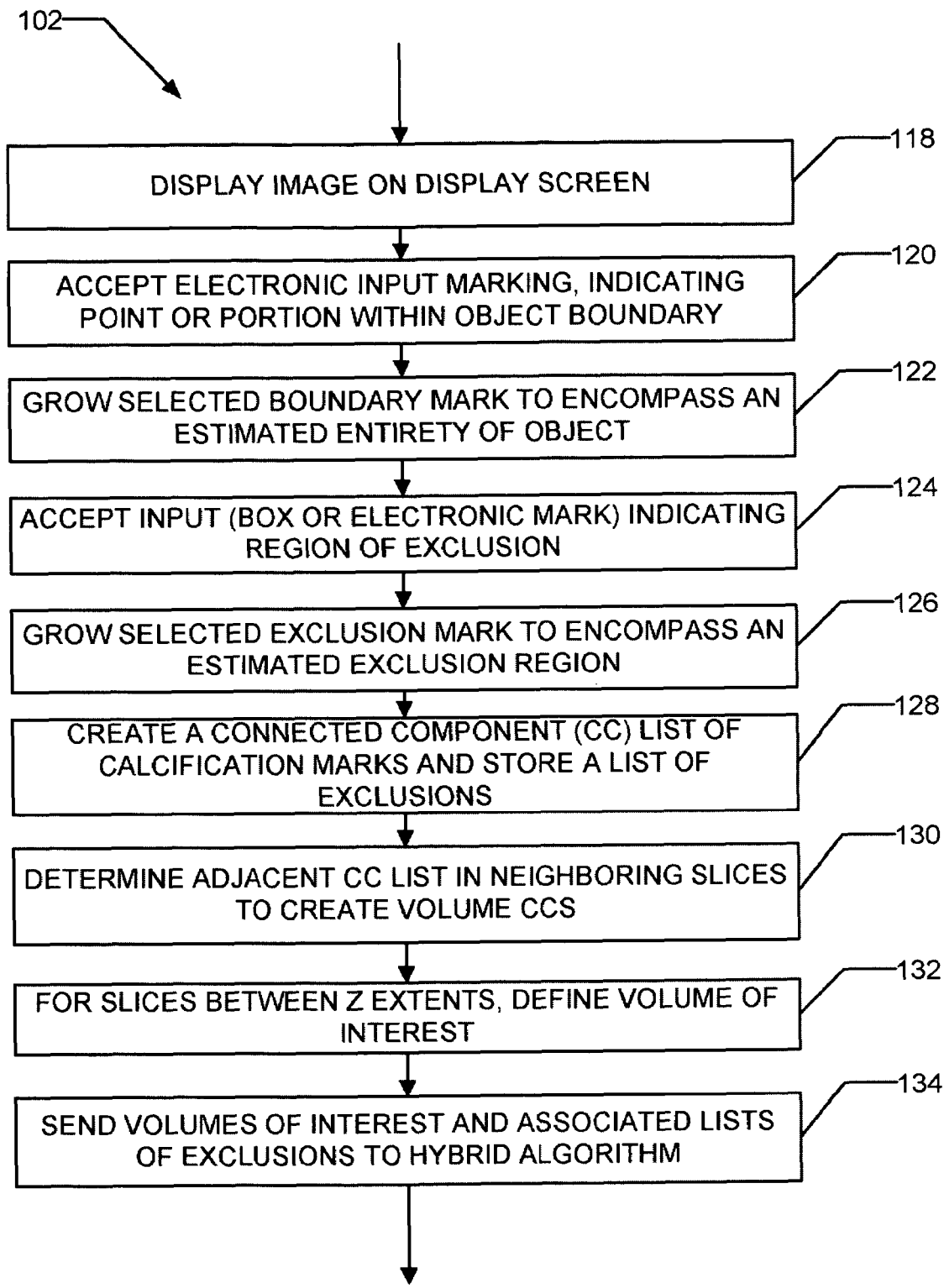
FIG. 6 is a flow chart further detailing the step of determining an object boundary and a region of exclusion.

Now referring to FIG. 6, determining 102 an object boundary and a region of exclusion comprises, in some configurations, displaying 118 an image on a display screen 42, and accepting 120 an electronic input mark indicating a portion or a point within the boundaries of the object. Accepting an electronic input mark can comprise receiving an electronic signal resulting from a button press on a mouse, keyboard, or light pen that moves a pointer or cursor on screen 42, for example. In some configurations, the mark is altered in size, for example, by growing 122 the mark to encompass an estimated entirety of the object. For example, in some configurations, a software module running in computer 36 looks at successive adjacent voxels in a slice of an image until a contrast boundaries and/or luminosity changes are sufficient to trigger a decision that a boundary of the object has been found.

Also in some configurations of the present invention, selecting a region for exclusion includes accepting 124 an electronic input indicating a box on the displayed image on display 42 representing a region of exclusion. In some configurations, an electronic mark is accepted rather than (or in addition to) a box representing the region of exclusion, and computer 36 grows 126 the exclusion mark to encompass an estimated exclusion region. For example, the mark is grown until a contrast boundary and/or a luminosity change is sufficient to trigger a decision that a boundary of the object (or perhaps a boundary of an artifact or other undesired region) has been found.

In some configurations of the present invention, identifying an object boundary in the region of interest of the image and the region or regions of exclusion further comprises creating 128 a connected component (CC) list or lists and a list of regions of exclusion. When the image being displayed on display screen 42 is a 3-dimensional (3-D) image comprising a plurality of image slices, some configurations determine 130 adjacent CC lists in one or more neighboring slices. The adjacent CC lists in neighboring slices are combined to create volume CCs.

Figure 7A:
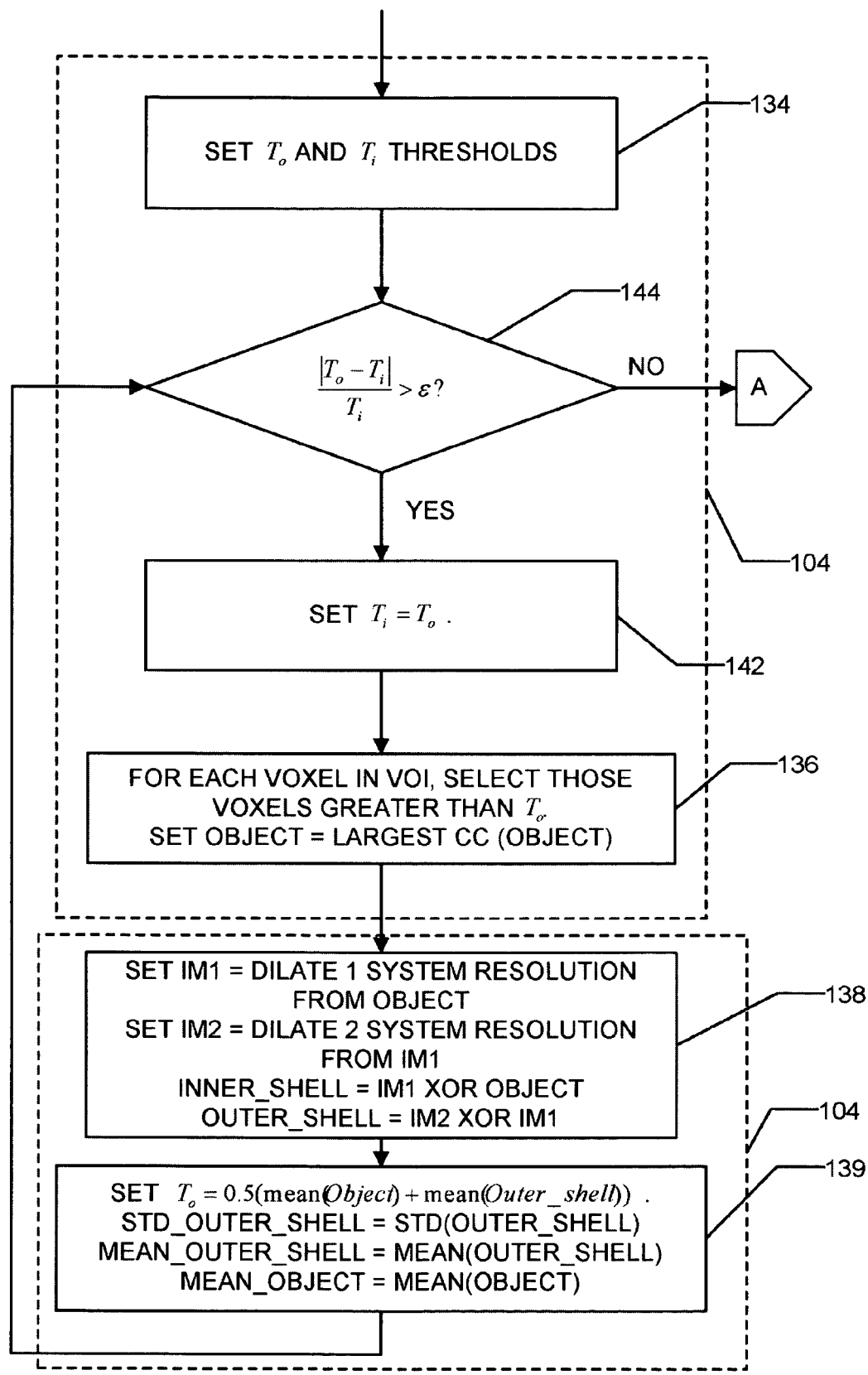
FIG. 7 is a flow chart further detailing the determination of an interior region, a transition region, and a background region using the object boundary and a transfer function of the imaging apparatus.
Figure 7B:
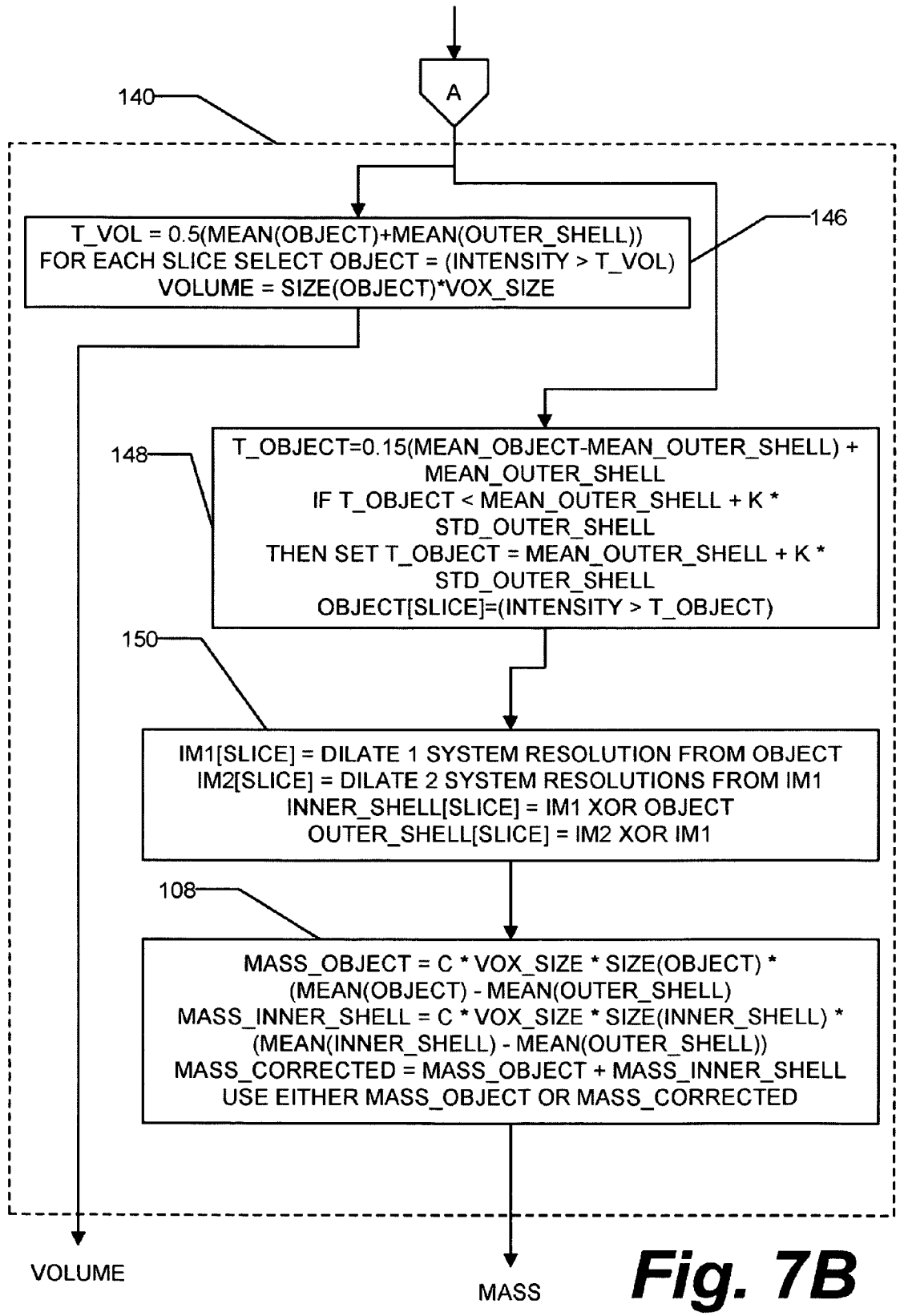

In some configurations, and in accordance with a system 10 image resolution (also referred to herein as "system resolution") measured in voxels, a volume of interest is determined 132 as a CC (or volume CC) plus a number of surrounding voxels. The number of surrounding voxels is a function of the system resolution, so that the volume of interest (VOI) is certain to enclose the object represented by the CC. Also, some configurations determine the interior region, transition region, and background region using the object boundary and a transfer function of the imaging apparatus using a method that includes some of the steps illustrated in the flowchart of FIG. 7. More particularly, an upper intensity threshold $T_o$ and a lower intensity threshold $T_i$ are set 134. While excluding voxels within the region or regions of exclusion, voxels of the object (i.e., the interior of the object) in the image are determined 136 in accordance with at least one of the upper intensity threshold or the lower intensity threshold. (An object may be darker or lighter than its surroundings, and/or the image may be a negative image.) For example, for each voxel in a volume of interest (which may include only one slice, and thus be more analogous to a region having a predetermined thickness, or which may include a plurality of slices), those voxels greater than, say, $T_o$ are determined. An object is then defined as the largest volume CC of the object defined by the voxels so determined. Next, an inner shell and an outer shell of the object is determined 138 in accordance with the determined or defined object and the system resolution. For example, an array of voxels IM1 is determined from the object by expanding ("dilating") the object by a number of voxels equal to the system resolution. For example, if the system resolution is one voxel, IM1 represents a collection of voxels including the object voxels plus all of the voxels one voxel distant from the object voxels. If the system resolution were two voxels, IM1 would be dilated 2 voxels in this configuration. Also, IM2 represents an array dilated twice the system resolution from IM1. (The dilation factor of two system resolutions for IM2 is suitable for many applications in which lesions or calcifications are to be quantified, but other dilation factors for either or both IM1 and IM2 can be determined empirically in other configurations or for other purposes.) The inner shell of the object is determined by excluding (XORing) the set (not the values) of voxels in the object with the set of voxels in IM1. In other words, those voxels only in IM1 and not in the object become the voxels in the inner shell. The outer shell of the object is determined by excluding the set of voxels in IM1 with those in IM2.

Some configurations of the present invention then reset one or more of the thresholds (in the configuration represented by FIG. 6, $T_o$ is reset) in preparation for another iteration to further refine the object, the inner shell, and the outer shell. More particularly, in the represented configuration, one of the threshold values is reset using a value written as:

$T_o$=0.5(mean(Object)+mean(Outer_shell)), where the means are taken of the intensities of the voxels in the object and in the outer shell of the object. Means and standard deviations (STD) are also determined in some configurations for later use:

STD_OUTER_SHELL=STD(OUTER_SHELL)

MEAN_OUTER_SHELL=MEAN(OUTER_SHELL)

MEAN_OBJECT=MEAN(OBJECT)

where the respective functions are functions of the intensities of the voxels within the outer shell and/or the object.

Also, some configurations provide a measure or of at least one of mass 148, 150, 108 or volume 110 of the object in the image utilizing the intensities of the determined inner shell or of the determined outer shell to determine the provided estimate.

In some configurations, the upper and/or lower thresholds are adjusted 139, 142, and steps 136 and 138 are repeated until an accuracy test 144 is satisfied.

In various configurations in which a volume estimate is provided, providing the volume estimate comprises utilizing 146 voxels of the object and determining the volume of the object in accordance with the number of voxels in the determined volume of the object and a size of each voxel. More particularly, in some configurations, a variable T_VOL is determined by a relationship written as:

T_VOL=0.5(MEAN(OBJECT)+MEAN(OUTER_SHELL)), where the mean functions are taken over the intensities of the voxels in the object and the outer shell. Then, for each slice (in a multislice or 3-D system), the object is selected from those voxels having an intensity greater than T_VOL. (In cases in which the object appears darker than the surroundings, or in case a negative image is used in which the object appears darker than the surroundings, those voxels having a lesser intensity are selected.) The estimate of the volume is equal to the size of the object (in number of voxels meeting the intensity criteria) times the size (volume) of a voxel.

In various configurations in which a mass estimate is provided, providing the mass estimate comprises determining 148 an adjusted interior region of the object. Also, an adjusted inner shell 150 of the object is determined in accordance with the size of the object. A mass of the object is determined 108 in accordance with the size of each voxel, the size of the adjusted interior region of the object, and a difference between representative intensities of the adjusted interior region of the object and of the adjusted outer shell of the object.

More specifically, in some configurations, a variable T_OBJECT is defined as a function of mean intensities of the object and its outer shell. For example, using the 15% (0.15) point on the slope of the transition to the object interior will capture most of the densities of the object without including excessive noise, (which can be adjusted in other configurations),

T_OBJECT=0.15*(MEAN_OBJECT−MEAN_OUTER_SHELL)+MEAN_OUTER_SHELL

Next, the following test is performed, using a parameter K which can be determined empirically, and if the test succeeds, T_OBJECT is set to another value as a function of the intensities of the mean outer shell and the standard deviation of the outer shell:

IF T_OBJECT<MEAN_OUTER_SHELL+ K*STD_OUTER_SHELL

THEN SET T_OBJECT=MEAN_OUTER_SHELL+ K*STD_OUTER_SHELL

Once T_OBJECT is determined, the object is defined (in each slice, in a multi-slice 3D image) as those voxels for which the intensity is greater than (or, in some configurations, less than) the value T_OBJECT.

In some configurations, providing a mass estimate also comprises determining 150 an adjusted inner shell of the object and an adjusted outer shell of the object, and determining 108 a mass of the object in accordance with the size of each voxel, the size of an adjusted interior region of the object, and a difference between representative intensities of the adjusted interior region of the object and intensities of the adjusted outer shell of the object.

More particularly in some configurations, the adjusted OBJECT[SLICE] of 148 is used to adjust the inner shell and outer shell using the relationships of 138 or similar relationships. Then, the mass of the object is determined using a relationship written:

MASS_OBJECT=C*VOX_SIZE*SIZE_OBJECT* (MEAN(OBJECT)−MEAN(OUTER_SHELL)), where C is a constant chosen in accordance with the material of the object (e.g., a known density of the material comprising a calcification), VOX_SIZE is the volume of a voxel, SIZE_OBJECT is the size of the object (i.e., its interior region, for example, the calcification region), and the means are functions of the intensities of the voxels within the object and of the outer shell of the object.

The mass of the inner shell is determined in some configurations in accordance with a relationship written:

MASS_INNER_SHELL=C*VOX_SIZE*SIZE(INNER_SHELL)*(MEAN(INNER_SHELL)−MEAN(OUTER_SHELL)), where SIZE(INNER_SHELL) is the number of voxels comprising the inner shell, and the means are intensity means of the voxels in the inner shell and the outer shell. The determined mass of the inner shell allows a corrected mass to be determined and output in some configurations of the present invention:

MASS_CORRECTED=MASS_OBJECT+MASS_INNER_SHELL

It will be understood that the "less than" test can be reversed depending upon the type of image (positive or negative) and type of object (light or dark). This illustrative example uses 2D slices to illustrate the regions of interest and those regions that are excluded. It should be noted that similar methods can be used for data with any dimensionality.

The methods and apparatus described herein are not limited to medical diagnostic applications, nor to CT. For example, and not by way of limitation, magnetic resonance images (MRI) from MRI imaging systems can be used, as can ultrasonic images from ultrasonic imaging systems. In addition, objects need not be limited to structures and organs inside a patient, but can also include other medical and non-medical objects and structures. It will thus be appreciated that accurate and robust estimated measurements for mass and volume of objects can be obtained. In some particularly advantageous configurations involving medical applications, accurate measurements of coronary calcification and lesions and can be obtained using configurations of the present invention, thus allowing increased confidence in CT imaging as a diagnostic method for calcification and lesions.

While the invention has been described in terms of various specific embodiments, those skilled in the art will recognize that the invention can be practiced with modification within the spirit and scope of the claims.

What is claimed is:

1. A computer-implemented method for quantifying an object in a larger structure using a reconstructed image obtained from an imaging apparatus, said method comprising:
   identifying an object boundary in a region of interest of the image and a region of exclusion;
   determining a mean value of intensity in a neighborhood of the object to estimate a background value, excluding the region of exclusion;
   determining an interior region, a transition region, and a background region of the object using the object boundary and a transfer function of the imaging apparatus;
   refining the object boundary using a system resolution of the imaging apparatus, the system resolution having a predefined number of voxels;
   determining a measure of object quantification utilizing intensities of at least one of the determined interior region or the transition region, wherein said determining a measure of object quantification further comprises determining a volume of interest as a connected component list (CC) plus a number of surrounding voxels that are a multiple of the predefined number of voxels of the system resolution; and
   displaying the measure of object quantification to a user.

2. A method in accordance with claim 1 wherein the measure of object quantification is at least one of mass, volume, texture, or shape of the object.

3. A method in accordance with claim 1 wherein the larger structure is a patient's body and the object is selected from the group consisting of lesions and vessel calcifications.

4. A method in accordance with claim 3 wherein said reconstructed image is an image including a heart of the patient, wherein said image is an image selected from the group consisting of a computed tomographic (CT) image, a magnetic resonance image, and an ultrasonic image.

5. A method in accordance with claim 1 wherein said identifying an object boundary further comprises displaying an image on a display screen, accepting an electronic input indicating a portion or point within the object boundary, and growing the mark indicating the portion or point within the object boundary to encompass an estimated entirety of the object.

6. A method in accordance with claim 5 wherein said selecting a region of exclusion further comprises accepting an electronic input mark indicating a box on the displayed image representing the region of exclusion.

7. A method in accordance with claim 6 wherein said selecting a region of exclusion further comprises accepting an electronic input mark indicating a portion or point within a region of exclusion, and growing the mark indicating the portion or point within the region of exclusion to encompass an estimated exclusion region.

8. A method in accordance with claim 1 wherein said identifying an object boundary in a region of interest of the image and a region of exclusion further comprises creating a connected component list (CCs) of objects and a list of regions of exclusion.

9. A method in accordance with claim 8 wherein said image is a dimensional imaging comprising a plurality of image slices and further comprising determining adjacent CC lists in one or more neighboring slices to create volume CCs.

10. A method in accordance with claim 1 wherein the measure of object quantification is at least one of mass or volume of the object, and wherein determining an interior region, a transition region, and a background region of the object using the object boundary and a transfer function of the imaging apparatus further comprises:
    setting an upper intensity threshold and a lower intensity threshold;
    and, while excluding voxels in the region of exclusion,
    (a) determining voxels of the object in the image in accordance with at least one of the upper intensity threshold or the lower intensity threshold;
    (b) determining an inner shell of the object and an outer shell of the object in accordance with the determined voxels of the object and the system resolution,
    and further wherein to determine at least one of mass or volume of the object, said method further comprises using at least one of the determined inner shell or the determined outer shell to determine the mass or volume of the object.

11. A method in accordance with claim 10 further comprising adjusting at least one of the upper intensity threshold and the lower intensity threshold and repeating said determining steps (a) and (b) until an accuracy test is satisfied.

12. A method in accordance with claim 10 wherein a measure of the volume of the object is displayed, and determining the volume of the object comprises utilizing determined voxels of the object and determining the volume of the object in accordance with the number of voxels in the determined volume of the object and a size of each voxel.

13. A method in accordance with claim 10 wherein a measure of the mass of the object is displayed, and determining the mass of the object comprises determining an adjusted interior region of the object, determining an adjusted inner shell of the object and an adjusted outer shell of the object, and determining a mass of the object in accordance with the size of each voxel, the size of an adjusted interior region of the object, and a difference between representative intensities of the adjusted interior region of the object and of the adjusted outer shell of the object.

14. A method in accordance with claim 10 wherein a measure of at least one of mass or volume of the object is displayed, and determining the mass or volume of the object comprises determining an adjusted interior region of the object, an adjusted inner shell of the object and an adjusted outer shell of the object, and determining a mass of the object in accordance with the size of each voxel, the size of the adjusted inner shell of the object, and a difference between representative intensities of the adjusted inner shell of the object and of the adjusted outer shell of the object.

15. An imaging system comprising:
a radiation source;
a radiation detector configured to detect radiation emitted by the radiation source passing through an object in a larger structure, and provide signals indicative of the object;
a processor and a display configured to utilize said signals provided by said radiation detector to display an image of the object, said image comprised of voxels;
an input device configured to accept an identification of an object boundary in a region of interest of the image and a region of exclusion; and
said imaging system further configured to:
identify the object boundary in the region of interest of the image and the region of exclusion;
determine a mean value of intensity in a neighborhood of the object to estimate a background value, excluding the region of exclusion;
determine an interior region, a transition region, and a background region of the object using the object boundary and a transfer function of the imaging apparatus;
refine the object boundary using a system resolution of said imaging system, wherein the system resolution has a predefined number of voxels; and
determine and display a measure of object quantification utilizing intensities of at least one of the determined interior region or the transition region by determining a volume of interest as a connected component list (CC) plus a number of surrounding voxels that are a multiple of the predefined number of voxels of the system resolution.

16. An imaging system in accordance with claim 15 wherein the measure of object quantification is at least one of mass, volume, texture, or shape of the object.

17. An imaging system in accordance with claim 15 wherein said imaging system is an imaging system selected from the group consisting of a computed tomographic (CT) imaging system, a magnetic resonance imaging system, and an ultrasonic imaging system.

18. An imaging system in accordance with claim 15 wherein to identify an object boundary, said imaging system further configured to display an image on the display, accept an electronic input mark indicative of the object, and alter the size of the accepted mark to encompass an estimated entirety of the object.

19. An imaging system in accordance with claim 15 wherein to select a region of exclusion, said imaging system further configured to accept an electronic input mark indicating a box on the displayed image representing the region of exclusion.

20. An imaging system in accordance with claim 15 further configured to set an upper intensity threshold and a lower intensity threshold and wherein the measure of object quantification is at least one of mass or volume of the object;
and, while excluding voxels of the in the region of exclusion said imaging system further configured to:
(a) determine voxels of the object in the image in accordance with at least one of the upper intensity threshold or the lower intensity threshold; and
(b) determine an inner shell of the object and an outer shell of the object in accordance with the determined voxels of the object and the system resolution,
and further wherein to display at least one of mass or volume of the object, said imaging system further configured to use at least one of the determined inner shell or the determined outer shell to determine displayed mass or volume.

21. A computer readable medium having instructions recorded thereon configured to instruct a processor to:
identify, in an image an object in a larger structure, an object boundary in a region of interest and identify a region of exclusion;
determine a mean value of intensity in a neighborhood of the object to estimate a background value, excluding the region of exclusion;
determine an interior region, a transition region, and a background region of the object using the object boundary and a transfer function of an imaging apparatus;
refine the object boundary using a system resolution of the imaging apparatus, wherein the system resolution has a predefined number of voxels;
determine a measure of object quantification utilizing intensities of at least one of the determined interior region or the transition region by determining a volume of interest as a connected component list (CC) plus a number of surrounding voxels that are a multiple of the predefined number of voxels of the system resolution; and
display the measure of object quantification to a user.

22. A computer readable medium in accordance with claim 21 wherein the measure of object quantification is at least one of mass, volume, texture, or shape of the object.

23. A computer readable medium in accordance with claim 21 wherein, to identify an object boundary in a region of interest and identify a region of exclusion, said instructions are further configured to instruct the processor to display an image including the object on a display, accept an electronic input mark indicative of the object to be identified, and alter the size of the accepted mark to encompass an estimated entirety of the object, and further to accept an electronic input mark indicating a box on the displayed image representing the region of exclusion.

24. A computer readable medium in accordance with claim 21 wherein the measure of object quantification is at least one of mass or volume of the object, and said instructions are further configured to instruct the processor to set an upper intensity threshold and a lower intensity threshold;
and, while excluding voxels of the image in the region of exclusion,
(a) determine voxels of the object in the image in accordance with at least one of the upper intensity threshold or the lower intensity threshold; and
(b) determine an inner shell of the object and an outer shell of the object in accordance with the determined voxels of the object and the system resolution,
and further wherein to display at least one of mass or volume of the object, said instructions are further configured to instruct the processor to use at least one of the determined inner shell or the determined outer shell to determine the displayed mass or volume.

* * * * *